March 30, 1954     L. D. BOYCE     2,673,474

TRANSMISSION CONTROL MECHANISM

Filed Sept. 13, 1950     2 Sheets-Sheet 1

INVENTOR.
LEONARD D. BOYCE
BY
*George R. Ericson*
ATTORNEY

March 30, 1954 L. D. BOYCE 2,673,474
TRANSMISSION CONTROL MECHANISM
Filed Sept. 13, 1950 2 Sheets-Sheet 2

*INVENTOR.*
LEONARD D. BOYCE
BY

ATTORNEY

Patented Mar. 30, 1954

2,673,474

UNITED STATES PATENT OFFICE 2,673,474

TRANSMISSION CONTROL MECHANISM

Leonard D. Boyce, Kirkwood, Mo., assignor to Carter Carburetor Corporation, St. Louis, Mo., a corporation of Delaware Application September 13, 1950, Serial No. 184,693

12 Claims. (Cl. 74—472)

This invention relates to transmission control mechanisms for automotive engines and consists particularly in novel automatic means for momentarily reducing torque on the engine drive shaft during automatic gear shifting.

In transmission gearing for an automobile provided with automatic means for shifting from low gear to direct drive when the vehicle is travelling at higher than a predetermined speed, it is desirable to momentarily reduce engine torque when the automatic shift from direct drive to low gear occurs. The reduction of engine torque may be accomplished by momentarily short circuiting the ignition system, but this method is not entirely satisfactory because of the backfiring which is likely to occur due to the presence of the unexploded fuel mixture in the exhaust system.

An object of this invention, therefore, is to provide means whereby engine torque may be momentarily reduced during automatic gear shifting without likelihood of backfiring.

A further object is to provide means whereby engine torque may be lowered during gear shifting by momentarily shutting off the supply of fuel to the cylinders with or without short circuiting the ignition.

An additional object is to provide simple and inexpensive means for shutting off the supply of fuel to the cylinders during gear shifting.

A still further object is to incorporate such simple and inexpensive means in a conventional carburetor structure.

Another object is to utilize the present transmission control system for actuating the fuel cut-off device.

Additional objects and advantages will appear from the drawings in which.

Figure 1:
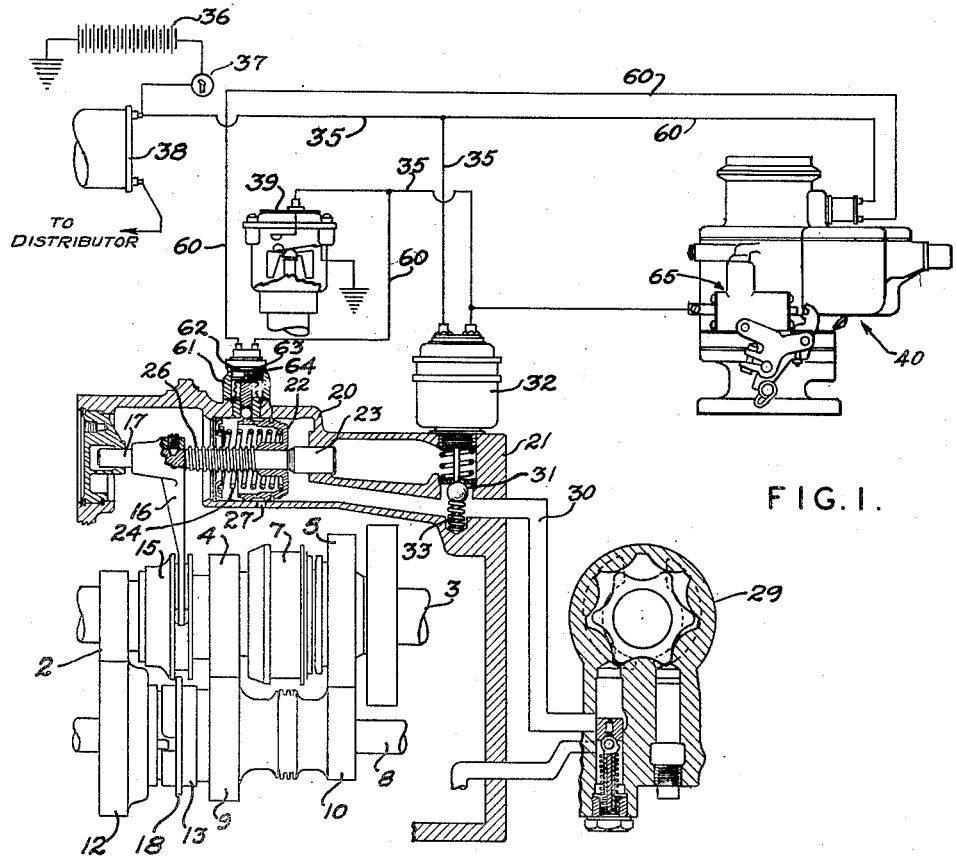
Fig. 1 is a diagrammatic view of a transmission control system incorporating means for shutting off the supply of fuel momentarily during gear shifting.

Referring now to the drawings, the numeral 1 generally indicates automotive transmission gearing including a main drive pinion 2 driven by the engine (not shown), vehicle drive shaft 3 coaxial with pinion 2, gears 4 and 5 rotatably mounted on said vehicle drive shaft and respectively engageable therewith by means of manually operated clutch sleeve 7. For transmission of power from main drive pinion 2 to gears 4 or 5 and thence to vehicle drive shaft 3, a countershaft 8 is provided, carrying gears 9 and 10 in engagement, respectively, with gears 4 and 5. A gear 12, in constant engagement with main drive pinion 2, is rotatably mounted on countershaft 8, and is engageable therewith by means of so-called "free-wheeling" control sleeve 13, so that when engaged, power is transmitted from the engine, through main drive pinion 2, gear 12, sleeve 13, countershaft 8, and gears 9 and 4 or 10 and 5 to vehicle drive shaft 3. An automatically controlled clutch sleeve 15 is mounted coaxially with engine driven shaft and vehicle drive shaft 3 and is formed with an annular groove to receive control fork 16 and to engage cooperating annular shoulder 18 on control sleeve 13, so that when engine speed exceeds a predetermined value clutch sleeve 15 is moved toward main drive pinion 2, the engine driven shaft is directly engaged with vehicle drive shaft 3, and control sleeve 13 disengages gear 12 from countershaft gears 9 and 10, thus permitting countershaft gears 9 and 10 to turn freely.

Control fork 16 is secured at one end to rod 17 which is slidably mounted at one end in an end wall of cylinder 20, which forms part of the transmission housing wall structure 21. A piston 22 is slidably mounted on rod 17 and is normally urged against a shouldered end portion 23 thereof by piston return coil spring 24 which is seated in the open end of cylinder 20, thus normally urging fork 16 to disengage sleeve 13 and engage sleeve 15.

The force which moves sleeve 15 is supplied by oil pressure applied in back of piston 22, thus compressing coil spring 26 on rod 17 against control fork 16, so as to move control fork 16 and sleeves 13 and 15 to the direct drive position. When hydraulic pressure is applied, piston 22 moves outward on rod 17 until it uncovers oil relief holes 27 in cylinder 20.

Oil under pressure is supplied to the back of piston 22 by means of oil pump 29, the outlet of which communicates with cylinder 20 via oil passage 30. Admission of oil under pressure to cylinder 20 is regulated by main control valve 31, which is actuated by solenoid 32. When solenoid 32 is energized, the valve is opened, permitting oil in passage 30 to pass directly into the transmission housing 21, thus relieving oil pressure against piston 22. When solenoid 32 is de-energized, spring 33 seats valve 31 and oil under pressure is directed against piston 22.

Main control valve solenoid 32 is controlled by an electrical circuit 35 which receives its energy from battery 36. Circuit 35 includes an ignition switch 37, the primary winding of ignition coil 38 and governor switch 39. Governor switch 39 is connected to and driven by the countershaft gear so as to reflect vehicle speed, and is calibrated to open circuit 35 when vehicle speed exceeds a predetermined value, so that solenoid 32 is then de-energized, permitting spring 33 to close valve 31; full oil pressure is thus exerted against piston 22, to move control fork 16 and sleeves 13 and 15 to the direct drive, freewheeling position.

A fuel mixture is supplied to the engine, not shown, by a carburetor, indicated at 40. Carburetor 40 has a mixture conduit 41, a throttle valve (not shown) mounted on shaft 43 therein, and a constant level fuel chamber 45 communicating with said mixture conduit through passageway 46 and outlets 47 formed in transverse vertical rib element 48. An air passage 50 formed with restricted air inlet 51 connects the upper portion of constant level chamber 45 with vent tube 52 which extends downwardly into fuel passageway 46. An additional air passageway 53 leads from the upper portion of constant level fuel chamber 45 to the upper portion of fuel passage 46 which it intersects above the normal fuel level. The size of passage 53 and its inlet opening 54 are such that sufficient air may be admitted therethrough to neutralize the vacuum adjacent fuel outlets 47, thereby preventing the discharge of fuel therefrom. The air inlet opening 54 of passage 53 is normally closed by needle type closure member 55, which is urged toward closed position by coil spring 56, so that during normal operation there is sufficient vacuum adjacent outlets 47 to draw therethrough sufficient quantities of fuel for operation. A solenoid 58 is mounted on carburetor 40 adjacent inlet 54, so that when energized solenoid 48 moves closure member 55 to the open position in opposition to spring 56.

Carburetor solenoid 58 is controlled by an electrical circuit 60 which also receives its energy from battery 36. Circuit 60 is normally broken at cylinder-mounted interrupter switch 61. Switch 61 consists of contact points 62 and 63 and piston actuated contact member 64; so that as piston 22 reaches the position in cylinder 20 where the shift is made from direct drive, an annular shoulder on piston 22 urges contact member 64 upwardly, thus closing circuit 60 and energizing carburetor solenoid 48. This opens valve 55, admitting air to fuel passageway 46, thus shutting off the passage of fuel therethrough. Thus for an instant, while the piston shoulder is in registry with the stem portion of contact member 64, the engine receives no fuel, and engine torque drops, thus permitting re-engagement of sleeves 13 and 15 for completing the shift out of direct drive.

Carburetor 40 also includes a kickdown switch generally indicated at 65, as and for the purposes described in my Patents Nos. 2,364,774 and 2,396,551.

Operation of the control system shown in Fig. 1 is as follows:

While the engine is stationary, governor switch 39 is closed, thus energizing solenoid 32, which retains valve 31 in the open position, permitting the oil in passage 30 to by-pass cylinder 20. Thus piston 22, under such conditions, is retained by spring 24 against the end wall of cylinder 20 and control fork 16, and control sleeves 15 and 13 are retained in the low gear position. When the vehicle speed exceeds a predetermined value, governor switch 39 opens, thus de-energizing solenoid 32, so that spring 33 urges valve 31 closed. Since the oil in passage 30 cannot escape through valve 31, its full pressure is exerted against the back of piston 22, thus urging piston 22 outwardly and fork 16, and control sleeves 15 and 13 to the direct drive free-wheeling position. During the movement of piston 22, contact bar 64 in switch 61 closes the gap between contact points 62 and 63, but since governor switch 39 is open, solenoid 58, controlling fuel cut-off valve 55 is not energized.

When vehicle speed is reduced below a predetermined value, governor switch 39 closes, thus energizing circuit 35 and solenoid 32 to open valve 31. Oil pressure behind piston 22 is thereupon reduced and spring 24 urges piston 22 inwardly, and fork 16 and control sleeves 15 and 13 out of the free-wheeling and toward the low gear position. The mechanism is calibrated so that when the actual shift occurs piston 22 closes switch 61. Since governor switch 39 is now closed, circuit 60 and solenoid 58 are energized and valve 55 is opened, admitting air through air passage 53 to fuel passage 46. Vacuum adjacent fuel outlets 48 is thus neutralized, and fuel ceases to pass therethrough into the mixture conduit thus causing a momentary reduction in engine torque. This condition is only of sufficient duration to permit the disengagement of direct drive control sleeve 15 and the engagement of free-wheeling control sleeve 13, so that driving force is thereby transmitted from main drive pinion 2, through gear 12 and gears 9 and 4 or 10 and 5 to the vehicle drive shaft. The same sequence of operations occurs when the downshift is caused by operation of kickdown switch 65, except that circuit 60, incorporating fuel cut-off solenoid 58 is grounded through kickdown switch 65 instead of governor switch 39.

Figure 2:
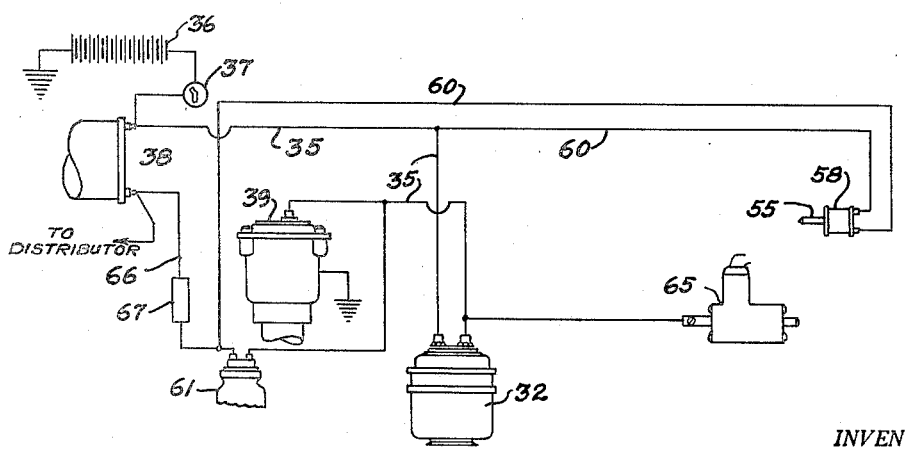
Fig. 2 is a circuit diagram showing a modified transmission control electrical circuit including fuel shut-off means.
Figure 3:
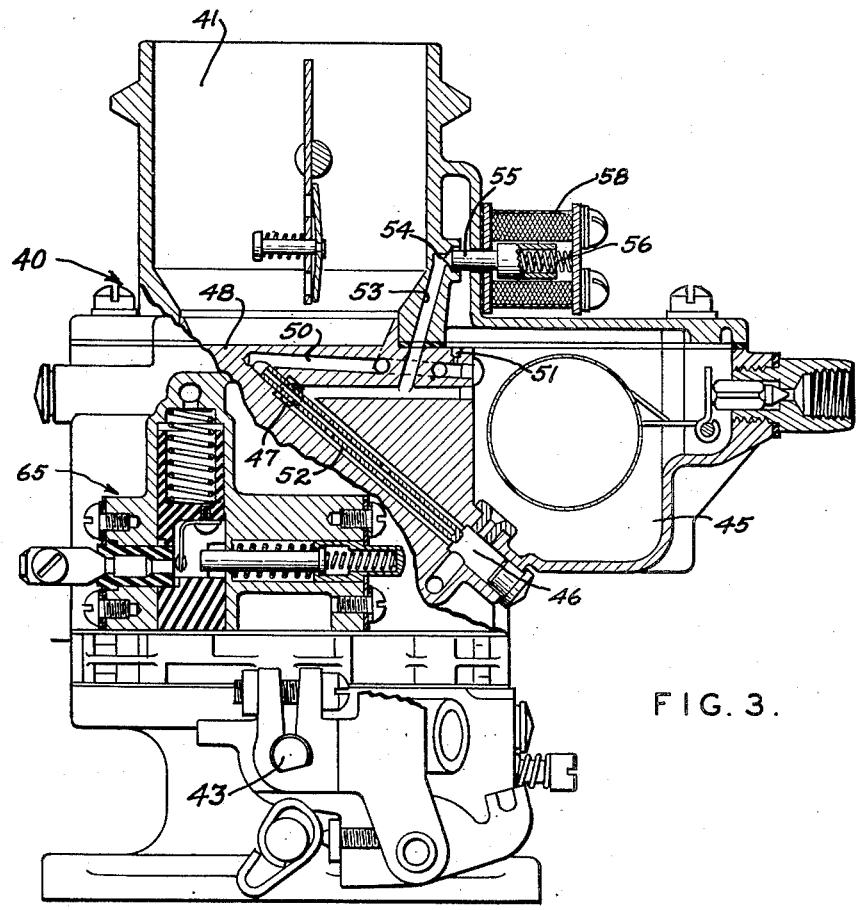
Fig. 3 is a carburetor incorporating a fuel shut-off device made according to my invention.

Fig. 2 is a modified circuit diagram in which a conductor 66 including resistor 67 connects the secondary winding of the ignition coil 38 to switch 61, so that when switch 61 is momentarily closed during gear shifting, the secondary winding is simultaneously grounded through switch 61, and governor switch 39 or kickdown switch 65. Thus, in the modified circuit of Fig. 3, when the shift occurs, the ignition as well as the fuel supply is momentarily shut off, with the resultant momentary drop in engine torque.

Operation of the modified control system shown in Fig. 2 is identical with that of Fig. 1 except that ignition coil 38 is short circuited through switch 61 simultaneously with the cutting off of fuel, thus momentarily interrupting the spark.

The invention may be modified as will occur to those skilled in the art and the exclusive use of all modifications as come within the scope of the appended claims is contemplated.

I claim:

1. In a transmission control mechanism for automotive engines including means for shifting gears responsive to changes in vehicle speed, a carburetor comprising a mixture conduit, a constant level fuel chamber, fuel passage means connecting said constant level fuel chamber with said mixture conduit, an air bleed passage communicating with said fuel passage at a point adjacent the normal fuel level therein, valve means normally closing said air bleed passage, and electro-magnetic means responsive to said gear-shifting means for opening said valve means to admit air to said fuel passage adjacent the fuel outlets.

2. In a transmission control mechanism for automotive engines including means for shifting gears responsive to changes in vehicle speed; a carburetor for said engine comprising a mixture conduit, a constant level fuel chamber, fuel passage means connecting said constant level fuel chamber with said mixture conduit, an air bleed passageway communicating between the atmosphere and said fuel passage and intersecting said fuel passage at a point above the normal fuel level therein, valve means normally closing said air bleed passage, a solenoid for opening said valve means, and contact means for energizing said solenoid during gear shifting.

3. In a transmission control mechanism for automotive engines including means for shifting gears responsive to changes in vehicle speed, a carburetor for said engine comprising a mixture conduit, a constant level fuel chamber, fuel passage means connecting said constant level fuel chamber with said mixture conduit, an air bleed passageway communicating between the atmosphere and said fuel passage and intersecting said fuel passage at a point adjacent the normal fuel level therein, valve means normally closing said air bleed passage, a solenoid for opening said valve, and an electrical circuit for energizing said valve means, said electrical circuit including contact means actuated by said gear-shift means.

4. In a transmission control mechanism for automotive engines including means for shifting gears responsive to changes in vehicle speed, a carburetor for said engine comprising a mixture conduit, a constant level fuel chamber, fuel passage means connecting said constant level fuel chamber with said mixture conduit, an air bleed passageway to said fuel passage and intersecting said fuel passage at a point adjacent the normal fuel level therein, valve means in said air bleed passage, spring means normally biasing said valve means toward closed position, a solenoid for opening said valve, and an electrical circuit for energizing said solenoid, said electrical circuit comprising a battery, a speed-responsive governor switch, and contact means responsive to said gear-shift means.

5. In a transmission control mechanism for automotive engines including means for shifting gears responsive to changes in vehicle speeds, a carburetor for said engine comprising a mixture conduit, a throttle valve therein, a constant level fuel chamber, fuel passage means connecting said constant level fuel chamber with said mixture conduit, an air bleed passageway to said fuel passage at a point adjacent the normal fuel level therein, valve means in said air bleed passage, spring means normally biasing said valve means toward closed position, a solenoid for opening said valve, and means responsive to substantially full throttle opening movement for downshifting said gears and simultaneously energizing said solenoid.

6. In a transmission control mechanism for automotive engines including means for shifting gears responsive to changes in vehicle speeds, a carburetor for said engine comprising a mixture conduit, a throttle valve therein, a constant level fuel chamber, fuel passage means connecting said constant level fuel chamber with said mixture conduit, an air bleed passageway to said fuel passage at a point adjacent the normal fuel level therein, valve means in said air bleed passage, spring means normally biasing said valve means toward closed position, a solenoid for opening said valve, and means responsive to substantially full throttle opening movement and to suction in said mixture conduit adjacent the fuel outlets therein for downshifting said gears and simultaneously energizing said solenoid.

7. In a transmission control mechanism for automotive engines including means for shifting gears responsive to changes in vehicle speeds, a carburetor for said engine comprising a mixture conduit, a throttle valve therein, a constant level fuel chamber, fuel passage means connecting said constant level fuel chamber with said mixture conduit, an air bleed passageway to said fuel passage at a point adjacent the normal fuel level therein, valve means in said air bleed passage, spring means normally biasing said valve means toward closed position, a solenoid for opening said valve, and means responsive to said gear-shifting means and to substantially full throttle opening movement for energizing said solenoid.

8. In a transmission control mechanism for automotive engines including means for shifting gears responsive to changes in vehicle speeds and to vehicle power requirements, a carburetor comprising a mixture conduit, a constant level fuel chamber, fuel passage means connecting said constant level fuel chamber with said mixture conduit, an air bleed passage communicating with said fuel passage at a point adjacent the normal fuel level therein, valve means normally closing said air bleed passage, and electromagnetic means responsive to said gear-shifting means for opening said valve means to admit air to said fuel passage adjacent the fuel outlets.

9. In a transmission control mechanism for automotive engines, a carburetor comprising a mixture conduit, a throttle valve therein, a constant level fuel chamber, fuel passage means connecting said constant level fuel chamber with said mixture conduit, an air bleed passage communicating with said fuel passage at a point adjacent the normal fuel level therein, valve means normally closing said air bleed passage, means for shifting gears responsive to vehicle speed and to substantially full throttle opening movement, and additional means responsive to said gear-shifting means for opening said valve means to admit air to said fuel passage.

10. In a transmission control mechanism for automotive engines, a carburetor comprising a mixture conduit, a throttle valve therein, a constant level fuel chamber, fuel passage means connecting said constant level fuel chamber with said mixture conduit, an air bleed passage communicating with said fuel passage at a point adjacent the normal fuel level therein, valve means normally closing said air bleed passage, means for shifting gears responsive to vehicle speed and to substantially full throttle opening movement, and a solenoid for opening said valve, said gear-shifting means including contact means for energizing said solenoid during gear shifting.

11. In a transmission control mechanism for automotive engines including means for shifting gears responsive to changes in vehicle speed, a carburetor comprising a mixture conduit, a constant level fuel chamber, fuel passage means connecting said constant level fuel chamber with said mixture conduit, an air passage communicating with said fuel passage at a point adjacent the normal fuel level, valve means normally closing said air passage, and means responsive to said gear shifting means for opening said valve means to admit air to said fuel passage adjacent the fuel outlets.

12. In a transmission control mechanism for automotive engines including means for shifting gears responsive to changes in vehicle speed, a carburetor comprising a mixture conduit, a fuel chamber, fuel passage means connecting said chamber and said conduit and including means responsive to said gear shifting means for regulating the flow of fuel through said passage means whereby to substantially interrupt the flow of fuel during gear shifting.

LEONARD D. BOYCE.

References Cited in the file of this patent

UNITED STATES PATENTS

| Number | Name | Date |
| --- | --- | --- |
| 1,938,968 | Michaud | Dec. 12, 1933 |
| 1,960,432 | Barker et al. | May 29, 1934 |
| 2,040,418 | Williams | May 12, 1936 |
| 2,084,377 | Barbaron | June 22, 1937 |
| 2,380,677 | Schjolin | July 31, 1945 |
| 2,434,717 | Randol | Jan. 20, 1948 |
| 2,454,614 | Peterson et al. | Nov. 23, 1948 |
| 2,498,600 | Brunken | Feb. 21, 1950 |
| 2,499,128 | Brunken | Feb. 28, 1950 |
| 2,623,617 | Snyder et al. | Dec. 30, 1952 |